(12) United States Patent
Muramatsu et al.

(10) Patent No.: US 9,902,436 B2
(45) Date of Patent: Feb. 27, 2018

(54) VEHICLE BODY STRUCTURE

(71) Applicant: HONDA MOTOR CO., LTD., Minato-ku, Tokyo (JP)

(72) Inventors: Yuki Muramatsu, Wako (JP); Hideaki Yamagishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 15/225,978

(22) Filed: Aug. 2, 2016

(65) Prior Publication Data
US 2017/0036705 A1 Feb. 9, 2017

(30) Foreign Application Priority Data
Aug. 4, 2015 (JP) .................................. 2015-154481

(51) Int. Cl.
*B62D 25/20* (2006.01)

(52) U.S. Cl.
CPC ..... *B62D 25/2036* (2013.01); *B62D 25/2027* (2013.01)

(58) Field of Classification Search
CPC .. B62D 25/025; B62D 25/20; B62D 25/2009; B62D 25/2027; B62D 25/2036
USPC .................. 296/187.08, 193.07, 193.08, 209
See application file for complete search history.

(56) References Cited

U.S. PATENT DOCUMENTS

| 8,398,158 B2 * | 3/2013 | Mildner | ............. B62D 25/2018 |
| | | | 296/187.08 |
| 2014/0284965 A1 * | 9/2014 | Mildner | ................. B62D 25/20 |
| | | | 296/187.08 |

FOREIGN PATENT DOCUMENTS

| JP | U3-8542 Y2 | 3/1991 | |
| JP | 10203423 A * | 8/1998 | ......... B62D 25/2027 |

* cited by examiner

*Primary Examiner* — Jason S Daniels
(74) *Attorney, Agent, or Firm* — Carrier Blackman & Associates, P.C.; Joseph P. Carrier; William D. Blackman

(57) ABSTRACT

A vehicle body structure includes a pair of side sills, a front floor panel provided between the pair of side sills, a floor tunnel and a cross member extending in a vehicle width direction at a rear end of the floor tunnel. The cross member includes a vertical wall. The vertical wall extends continuously in the vehicle width direction between the pair of side sills, is joined to the rear end of the floor tunnel, and closes an opening of the rear end. A partition portion partitioning an inside of the floor tunnel in the vehicle longitudinal direction and a connecting portion connecting a lower portion of the partition portion and a lower portion of the vertical wall are disposed in the floor tunnel.

11 Claims, 5 Drawing Sheets

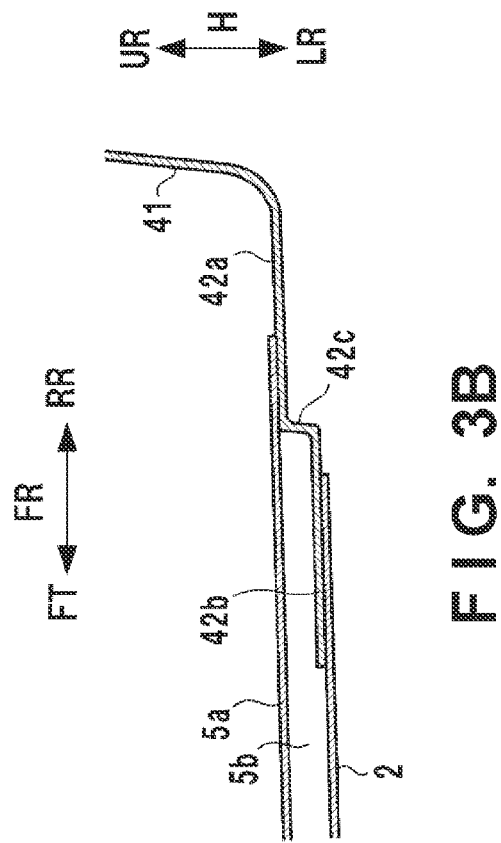
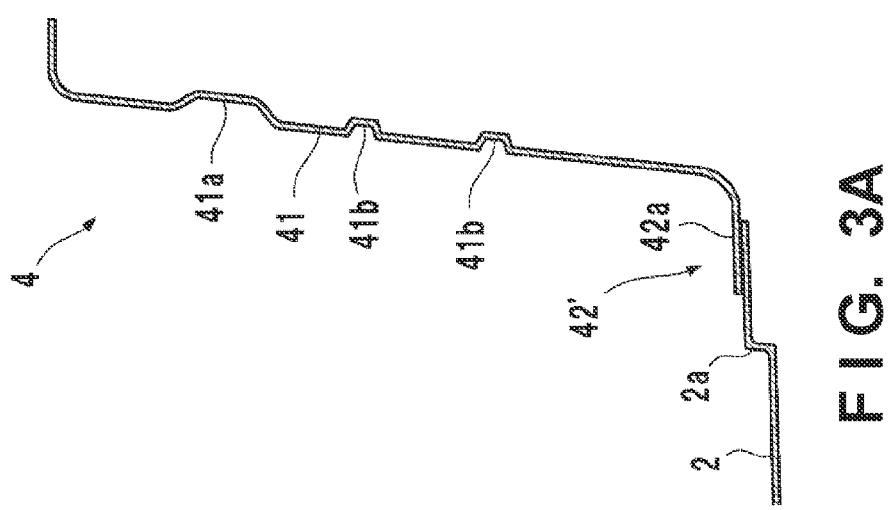

VEHICLE BODY STRUCTURE

BACKGROUND OF THE INVENTION

Field of the Invention

The present invention relates to a vehicle body structure.

Description of the Related Art

As the floor structure of a vehicle body, a structure including a floor tunnel extending in the longitudinal direction is known (for example, Japanese Utility Model Publication No. 3-8542). The floor tunnel not only forms a space to dispose components such as a fuel pipe and an exhaust pipe which extend in the vehicle longitudinal direction but also contributes to improvement of floor rigidity.

The floor tunnel may be unable to obtain sufficient rigidity to a load in the direction of opening/closing the left and right side walls in the side-to-side direction because of the sectional shape. Hence, for example, it may be impossible to sufficiently suppress the vertical vibration of the left and right floors of the floor tunnel, or a disadvantage may exist from the viewpoint of load dispersion at the time of a side impact. As a measure, for example, a brace that connects the left and right floor panel bottom portions so as to pass under the floor tunnel may be provided. However, this increases the weight of the vehicle body.

SUMMARY OF THE INVENTION

It is an object of the present invention to improve floor rigidity on the periphery of a floor tunnel while suppressing an increase in the weight of a vehicle body.

According to an aspect of the present invention, there is provided a vehicle body structure comprising: a pair of side sills arranged so as to be spaced apart in a vehicle width direction from each other; a front floor panel provided between the pair of side sills; a floor tunnel extending in a vehicle longitudinal direction at a center in the vehicle width direction between the pair of side sills and protruding upward from the front floor panel; and a cross member extending in the vehicle width direction at a rear end of the floor tunnel, wherein the cross member includes a vertical wall extending upward with respect to the front floor panel, the vertical wall extends continuously in the vehicle width direction between the pair of side sills, is joined to the rear end of the floor tunnel, and closes an opening of the rear end, and a partition portion configured to partition an inside of the floor tunnel in the vehicle longitudinal direction and a connecting portion configured to connect a lower portion of the partition portion and a lower portion of the vertical wall are disposed in the floor tunnel.

Further features of the present invention will become apparent from the following description of exemplary embodiments (with reference to the attached drawings).

BRIEF DESCRIPTION OF THE DRAWINGS

FIG. 3A is a sectional view of a cross member and a front floor panel of another example;

FIG. 3B is a sectional view of a floor frame;

DESCRIPTION OF THE EMBODIMENTS

Figure 1:
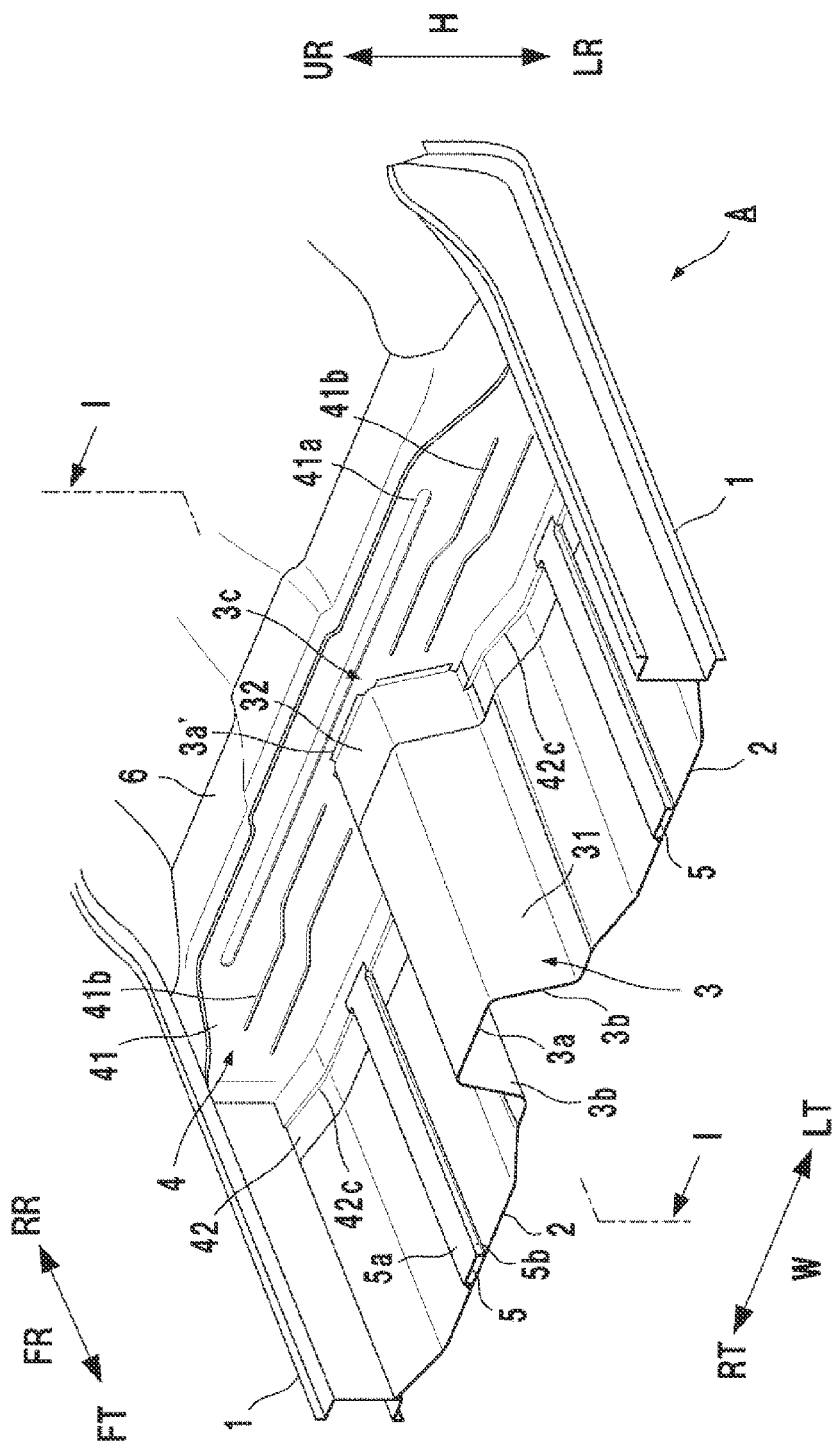
FIG. 1 is a perspective view of a vehicle body structure according to an embodiment of the present invention.

A vehicle body structure according to an embodiment of the present invention will now be described. In the drawings, an arrow FR indicates the longitudinal direction of a vehicle body (longitudinal direction of a vehicle). FT indicates the front side, and RR indicates the rear side. An arrow W indicates the vehicle width direction. LT indicates the left side when viewed from the vehicle advancing direction, and RT indicates the right side. An arrow H indicates the vertical direction. UR indicates the upper side, and LR indicates the lower side.

FIG. 1 is a perspective view showing a vehicle body structure A according to an embodiment of the present invention. The vehicle body structure A is the floor structure on the periphery of the rear seat of a vehicle, and includes a pair of side sills 1, a front floor panel 2, a floor tunnel 3, a cross member 4, a pair of floor frames 5, and a rear floor panel 6.

The pair of side sills 1 are arranged so as to be spaced apart in the vehicle width direction from each other. The left and right side sills 1 are extended in the vehicle longitudinal direction. The front floor panel 2 is a member that forms the vehicle body bottom portion under the rear seat. The front floor panel 2 is provided between the pair of side sills 1 and joined to the side sills 1. The side sills 1 extend in the vehicle longitudinal direction on the outer edges of the front floor panel in the vehicle width direction.

The floor tunnel 3 is a center tunnel extending in the vehicle longitudinal direction at the center in the vehicle width direction between the pair of side sills 1. The floor tunnel 3 convexly protrudes upward from the front floor panel 2. The floor tunnel 3 includes an upper wall 3a and left and right side walls 3b and is open to the lower side so as to have a trapezoidal section. The floor tunnel 3 may be formed from the same member as the front floor panel 2, or formed by joining another member. In this embodiment, an example in which the floor tunnel 3 is formed by joining another member is shown.

In this embodiment, the floor tunnel 3 has a two-member structure including a main body portion 31 and a joint portion 32. However, it may have a single-member structure. The main body portion 31 is a member that forms the entire floor tunnel 3. The joint portion 32 is a member that joins the floor tunnel 3 to the cross member 4. The joint portion 32 forms a rear end 3c of the floor tunnel 3.

The cross member 4 is a member extending in the vehicle width direction at the rear end 3c of the floor tunnel 3. The two ends of the cross member 4 are joined to the pair of side sills 1.

One of the pair of floor frames 5 is provided on the front floor panel 2 on the left side of the floor tunnel 3, and the other is provided on the front floor panel 2 on the right side of the floor tunnel 3. The floor frames 5 extend in the vehicle longitudinal direction and are joined to the front floor panel 2. Each floor frame includes an upper wall 5a and a pair of left and right side walls 5b, and forms a closed section together with the front floor panel 2.

The rear floor panel 6 is a member that forms the vehicle body bottom portion of the rear portion of the vehicle (for example, from the rear seat to the trunk room), and extends backward from above the cross member 4 in the vehicle longitudinal direction.

Figure 2A:
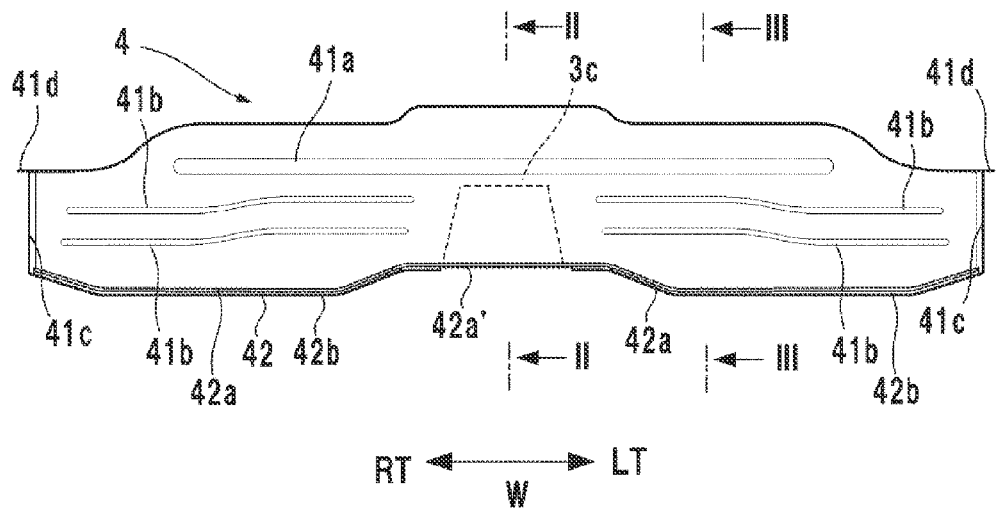
FIG. 2A is a front view of a cross member.
Figures 2B, 2C:
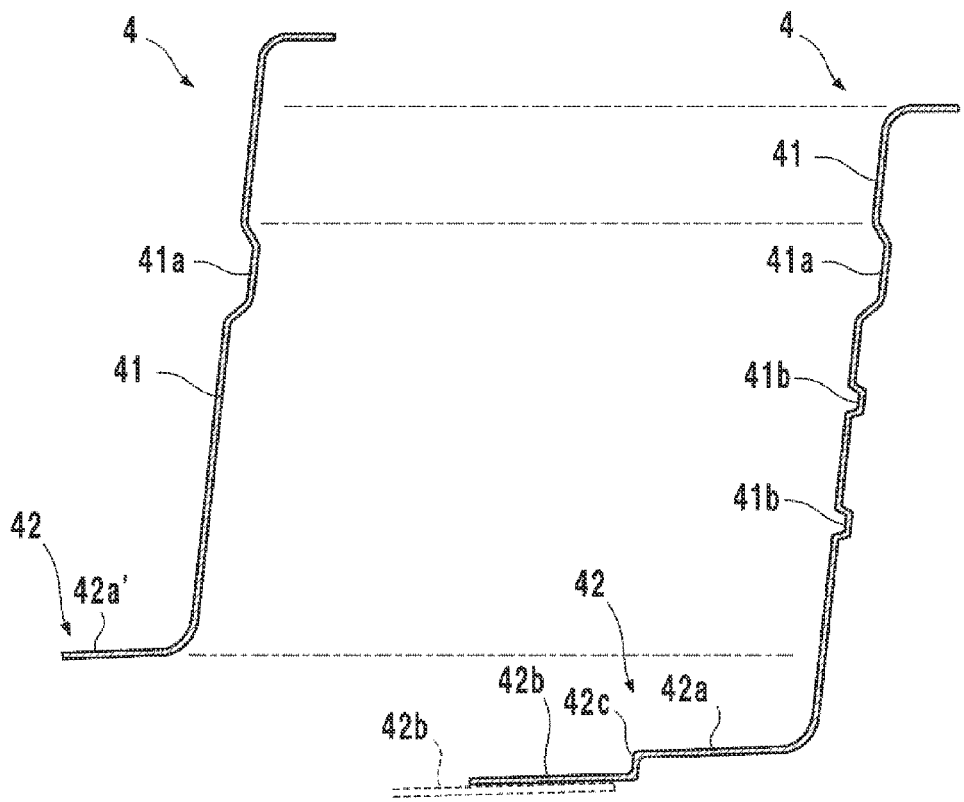
FIG. 2B is a sectional view taken along a line II-II in FIG. 2A.
FIG. 2C is a sectional view taken along a line III-III in FIG. 2A.
Figure 4:
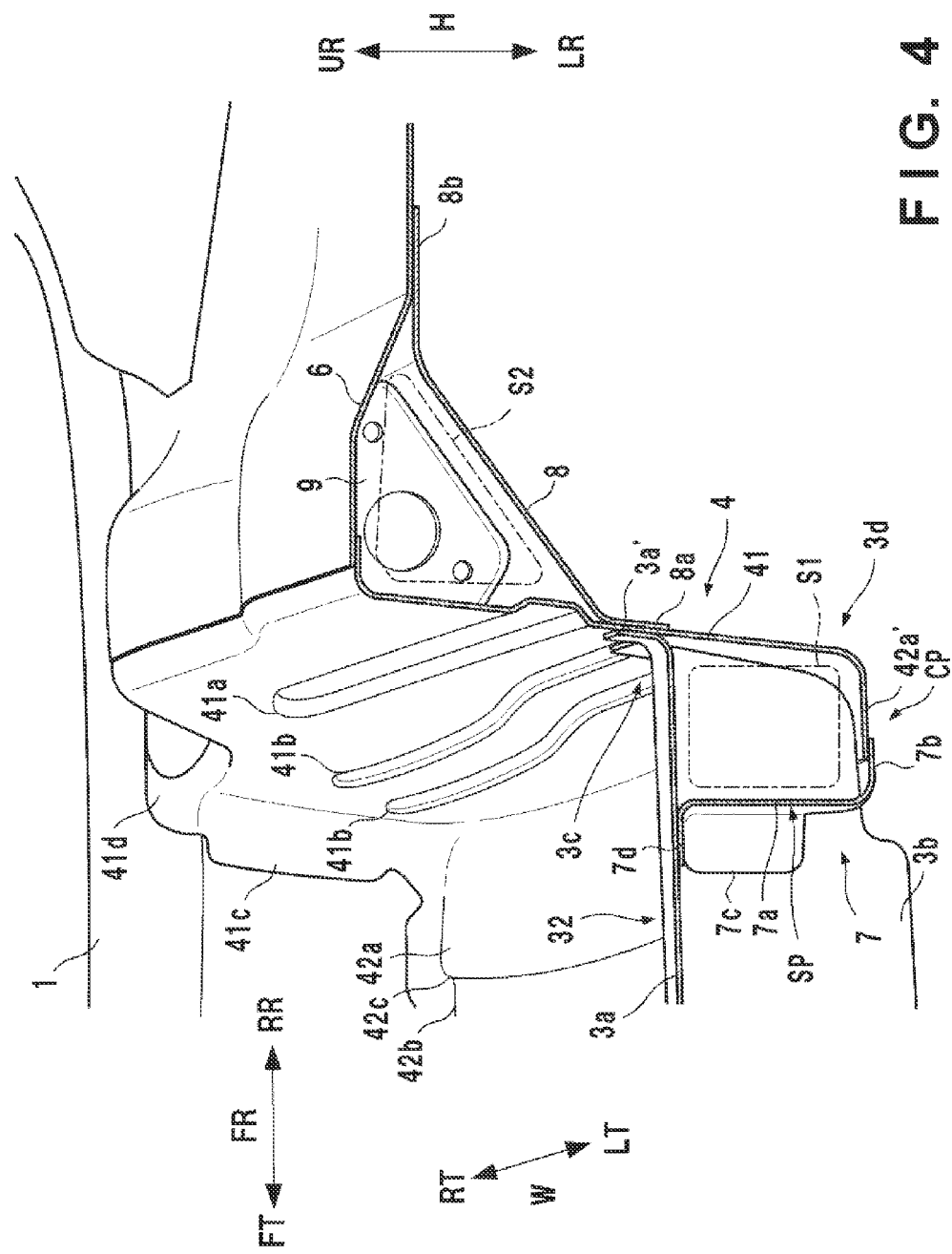
FIG. 4 is a sectional view taken along a line I-I in FIG. 1.

The vehicle body structure A will be described in more detail with reference to FIGS. 2A to 2C and 4 in addition to FIG. 1. FIG. 2A is a front view of the cross member 4. FIG. 2B is a sectional view of the cross member 4 taken along a line II-II in FIG. 2A. FIG. 2C is a sectional view of the cross member 4 taken along a line III-III in FIG. 2A. FIG. 4 is a sectional view taken along a line I-I in FIG. 1 so as to show a sectional structure slightly on the right side with respect to the center of the floor tunnel 3.

The cross member 4 integrally includes a vertical wall 41 and a flange portion 42. The vertical wall 41 is a member having a plate shape as a whole. The vertical wall 41 extends upward with respect to the front floor panel 2, and continuously extends in the vehicle width direction between the pair of side sills 1. Flange portions 41c and 41d joined to the side sills 1 are provided at the two ends of the vertical wall 41. The left end of the vertical wall 41 is joined to the left side sill 1, and the right end is joined to the right side sill 1.

Since the cross member 4 (particularly, the vertical wall 41) is extended continuously in the vehicle width direction between the pair of side sills 1, a load at the time of a side impact can be transmitted from one side sill 1 to the other side sill 1, thereby improving the side impact performance.

The vertical wall 41 includes a plurality of beads 41a and 41b extending in the vehicle width direction. Since the beads 41a and 41b improve the load transmission dispersion characteristic in the vehicle width direction, the riding comfort can be improved. In this embodiment, the beads 41a and 41b are concave portions projecting backward in the vehicle longitudinal direction. One wide bead 41a and a plurality of narrow beads 41b are formed. The bead 41a is formed on the upper side of the vertical wall 41 so as to run across above the floor tunnel 3. The beads 41b are formed on the left and right sides of the floor tunnel 3. Note that in this embodiment, the plurality of beads 41a and 41b are provided. However, one bead may be provided.

The vertical wall 41 or the entire cross member 4 can be formed by, for example, press-working one plate material (for example, a steel plate). In this case, the weight can be reduced as compared to a case in which the vertical wall 41 or the entire cross member 4 is formed by a plurality of plate materials. In addition, the space occupied by the vertical wall 41 can be reduced. This contributes to an increase in the space to arrange a peripheral component or expansion of the space at the feet of an occupant. An example of the space to arrange a peripheral component is the space under the rear floor panel 6, and contribution to expansion of this space is attained. For example, a fuel tank can be disposed in the space under the rear floor panel 6. When this space is expanded, a fuel tank of a larger volume can be disposed.

The vertical wall 41 is joined to the rear end 3c of the floor tunnel 3 by the joint portion 32. In addition, the center portion of the vertical wall 41 closes an opening 3d of the rear end 3c. In FIG. 2A, a broken line indicates the portion at which the rear end 3c is joined. FIG. 4 shows a state in which the vertical wall 41 closes the opening 3d of the rear end 3c.

Since the vertical wall 41 closes the opening 3d of the rear end 3c, the rigidity to a load in the direction of opening/closing the left and right side walls 3b of the floor tunnel 3 in the side-to-side direction improves. In addition, since the opening 3d of the floor tunnel 3 is closed using the cross member 4, it is possible to improve floor rigidity on the periphery of the floor tunnel 3 while suppressing an increase in the number of components or an increase in the weight of the vehicle body. Note that if the area of the opening 3d closed by the vertical wall 41 is large, an advantage can be attained from the viewpoint of rigidity improvement. However, the vertical wall 41 need not always close the entire opening 3d, and need only extend on the left and right side walls 3b.

The flange portion 42 is provided to project from the lower end of the vertical wall 41 forward in the vehicle longitudinal direction, and located at the lower end of the cross member 4. The flange portion 42 has a bent portion 42c formed at the intermediate portion in the vehicle longitudinal direction, and includes an upper portion 42a on the upper side on the back side in the vehicle longitudinal direction, and a lower portion 42b on the lower side on the front side in the vehicle longitudinal direction. The lower portion 42b is joined to the front floor panel 2. The load transmission characteristic between the front floor panel 2 and the cross member 4 can be improved via the flange portion 42, and the riding comfort can be improved.

In the flange portion 42, a portion inserted into the floor tunnel 3 is formed from only a center portion 42a' without the bent portion 42c and the lower portion 42b. The center portion 42a' is a portion that extends to run across the rear end 3c and continues to the upper portion 42a. However, the center portion 42a' is narrower than the upper portion 42a in the vehicle longitudinal direction.

The bent portion 42c is formed by bending the flange portion 42 in the vertical direction, and extends in the vehicle width direction. In this embodiment, the bent portion 42c has a two-step bent form obtained by bending the flange portion 42 downward and then forward and generates a vertical step between the upper portion 42a and the lower portion 42b.

In this embodiment, since the flange portion 42 includes the bent portion 42c, rigidity can be improved as compared to a case in which the flange portion 42 is formed flat. In particular, since the ridge line (bend line) of the bent portion 42c is oriented in the vehicle width direction, the rigidity of the flange portion 42 in the vehicle width direction can be improved. It is therefore possible to improve the load transmission performance of the flange portion 42 in the vehicle width direction and improve the side impact performance. The bent portion 42c breaks at the center in the vehicle width direction. However, since the floor tunnel 3 is connected there to increase the rigidity, the load transmission performance between the pair of side sills 1 can further be improved. Note that the bent portion 42c may continuously be formed in the vehicle width direction between the pair of side sills 1.

In this embodiment, the bent portion 42c is formed on the flange portion 42. However, it may be formed on the front floor panel 2. FIG. 3A is a sectional view showing an example. The sectional view corresponds to the cutting position shown in FIG. 2C. In the example of FIG. 3A, the flange portion 42 does not have the lower portion 42b and the bent portion 42c, and the upper portion 42a is joined to the front floor panel 2.

The front floor panel 2 includes a bent portion 2a corresponding to the bent portion 42c. Even if the bent portion 2a is formed on the front floor panel 2, the same effect as in the case in which the bent portion 42c is formed on the flange portion 42 can be obtained from the viewpoint of the rigidity and the load transmission performance in the vehicle width direction.

The arrangement of the rear end of the floor frame 5 will be described next with reference to FIGS. 1 and 3B. FIG. 3B is a vertical sectional view of the rear end of the floor frame 5 at the center in the vehicle width direction.

The rear end of the floor frame 5 is joined to the bent portion 42c. When the rear end of the floor frame 5 is joined to the bent portion 42c having high rigidity, load dispersion between, for example, the floor frame 5 and the cross member 4 can be improved. In addition, the total length of the floor frame 5 can be shortened as compared to an arrangement in which the floor frame 5 is joined to the vertical wall 41, and the weight can accordingly be reduced.

Note that in the arrangement in which the bent portion 2a is formed on the front floor panel 2, as in the example of FIG. 3A, an arrangement in which the rear end of the floor frame 5 is joined to the bent portion 2a can be employed. In this case as well, the total length of the floor frame 5 can be shortened, and the weight can accordingly be reduced.

A partition member 7 disposed in the floor tunnel 3 will be described next with reference to FIGS. 4 and 5. The partition member 7 is an L-shaped member including a vertical wall 7a and a bottom wall 7b. Flange portions 7c and 7d formed integrally with the vertical wall 7a are joined to the inner surfaces of the side walls 3b of the floor tunnel 3. In addition, the bottom wall 7b is joined to the center portion 42a' of the flange portion 42 of the cross member 4.

The vertical wall 7a is arranged to connect the left and right side walls 3b in the floor tunnel 3, and forms a partition portion SP that partitions the floor tunnel 3 in the vehicle longitudinal direction. The bottom wall 7b extends from the lower portion of the vertical wall 7a backward in the vehicle longitudinal direction. The bottom wall 7b and the center portion 42a' form a connecting portion CP that connects the lower portion of the partition portion SP (vertical wall 7a) and the lower portion of the vertical wall 41 of the cross member 4.

When the partition member 7 is provided, a tubular body in the vehicle width direction is formed in the floor tunnel 3 by the vertical wall 41, the partition portion SP, the connecting portion CP, and the upper wall 3a of the floor tunnel 3. Hence, the rigidity to a load in the direction of opening/closing the left and right side walls 3b of the floor tunnel 3 in the side-to-side direction improves. In this embodiment, the tubular body forms a tubular body having a rectangular closed section, as indicated by a virtual line S1, and can therefore more firmly resist the load in the direction of opening/closing the left and right side walls 3b of the floor tunnel 3 in the side-to-side direction.

In addition, since the rigidity of the rear portion of the floor tunnel 3 is reinforced using the vertical wall 41 as well, the partition portion SP can have a relatively simple structure. This can suppress an increase in the weight as compared to a case in which a brace or the like is provided on the bottom surface of the front floor panel 2 so as to run across the floor tunnel 3. Since the length of the connecting portion CP in the vehicle longitudinal direction may be shorter than the vertical length of the partition portion SP, a relatively compact reinforcing structure can be formed in the floor tunnel 3. Furthermore, since the structure can be formed by joining the partition member 7 and the peripheral structure by welding or the like, the assembly operation can be facilitated. Note that in this embodiment, the connecting portion CP is formed by the bottom wall 7b and the center portion 42a'. However, the connecting portion CP may be formed by only the bottom wall 7b or only the center portion 42a'.

Figure 5:
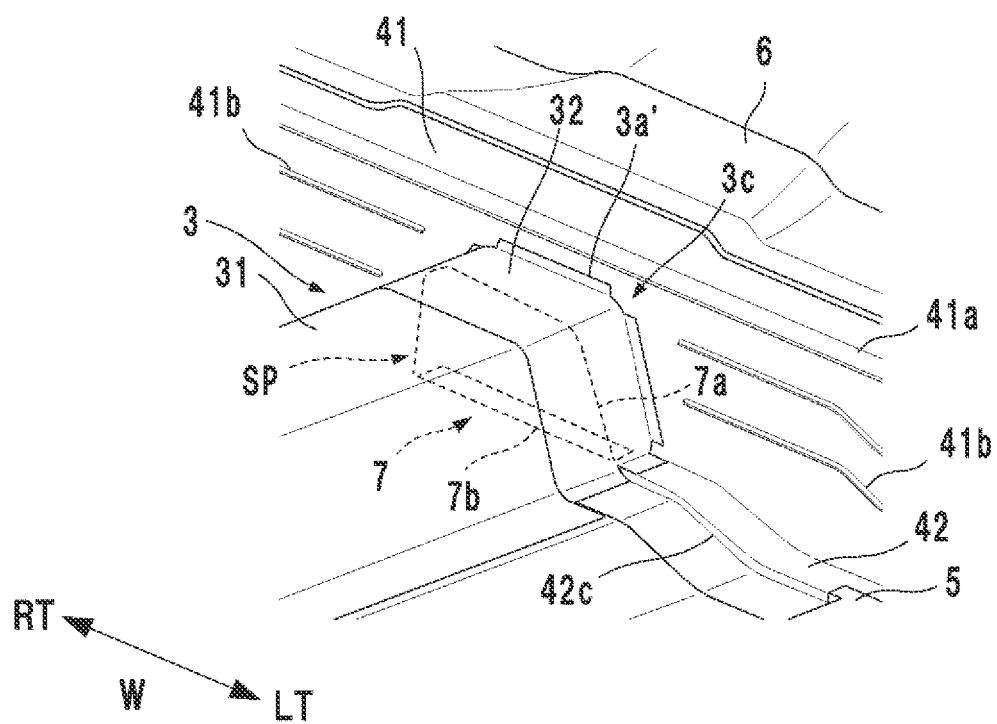
FIG. 5 is an explanatory view showing the positional relationship between a partition portion and a bent portion.

In this embodiment, the partition portion SP (vertical wall 7a) is arranged to continue to the bent portion 42c in the vehicle width direction, as shown in FIG. 5. In other words, the left and right ends of the vertical wall 7a and the end of the bent portion 42c at the center in the vehicle width direction are located at the same position in the vehicle longitudinal direction. Since the bent portion 42c and the partition portion SP continue in the vehicle width direction at a portion where the rigidity vehicle width direction improves, the load transmission performance in the vehicle width direction can be improved in a wide range, and the side impact performance can be improved. Particularly, in this embodiment, the outer ends of the bent portion 42c in the vehicle width direction are joined to the side sills 1. For this reason, since the partition portion SP and the bent portion 42c extend as a whole between the pair of side sills 1, the load transmission performance in the vehicle width direction can be improved between the pair of side sills 1. Note that in the arrangement in which the bent portion 2a is formed on the front floor panel 2, as in the example of FIG. 3A, an arrangement in which the partition portion SP (vertical wall 7a) and the bent portion 2a are arranged to continue in the vehicle width direction can also be employed. In this case as well, the load transmission performance in the vehicle width direction can be improved, and the side impact performance can be improved.

The arrangement on the periphery of the rear floor panel 6 will be described next with reference to FIG. 4. The rear floor panel 6 extends backward from the upper end of the vertical wall 41, and protrudes upward at the center in the vehicle width direction.

A connection panel 8 extending from the vertical wall 41 backward in the vehicle longitudinal direction is disposed under the rear floor panel 6. The connection panel 8 extends backward and upward from a position (in this embodiment, the joint portion of the upper wall 3a of the floor tunnel 3) lower than the upper end of the vertical wall 41. A flange portion 8a at the front end in the vehicle longitudinal direction is joined to the vertical wall 41, and a flange portion 8b at the rear end is joined to the rear floor panel 6.

The floor tunnel 3 includes a flange portion 3a' extending from the upper wall 3a. The flange portion 3a' is joined to the front surface of the vertical wall 41. At this joint portion, the flange portion 8a of the connection panel 8 is joined to the rear surface of the vertical wall 41, and the flange portion 3a', the vertical wall 41, and the flange portion 8a are joined while being overlaid in the vehicle longitudinal direction. When the three panel members are overlaid and joined, a load from the upper wall 3a of the floor tunnel 3 can smoothly be transmitted to the rear floor side, and the riding comfort can be improved.

The vertical wall 41, the rear floor panel 6, and the connection panel 8 form a tubular body mainly at the center in the vehicle width direction. When the tubular body is formed, the rigidity of the rear floor can be improved. The tubular body has an almost triangular (truss-shaped) closed section indicated by a virtual line S2. As compared to a case in which the tubular body has a rectangular closed section, space saving can be implemented while improving the rigidity. This contributes to an increase in the space to arrange a peripheral component. For example, in an arrangement that disposes a fuel tank under the connection panel 8, the capacity of the fuel tank can be increased.

A bulkhead 9 joined to the inner surfaces of the vertical wall 41, the rear floor panel 6, and the connection panel 8 is arranged in the tubular body in such a posture that partitions the inside of the tubular body in the vehicle width direction. The rigidity of the tubular body improves, and the floor rigidity of the rear floor can further be improved. A plurality of through holes are formed in the bulkhead 9 to reduce the weight.

SUMMARY OF EMBODIMENT

1. According to the embodiment, there is provided a vehicle body structure (for example, A) comprising:

a pair of side sills (for example, 1) arranged so as to being spaced apart in a vehicle width direction from each other;

a front floor panel (for example, 2) provided between the pair of side sills;

a floor tunnel (for example, 3) extending in a vehicle longitudinal direction at a center in the vehicle width direction between the pair of side sills and protruding upward from the front floor panel; and a cross member (for example, 4) extending in the vehicle width direction at a rear end of the floor tunnel, wherein the cross member includes a vertical wall (for example, 41) extending upward with respect to the front floor panel, the vertical wall extends continuously in the vehicle width direction between the pair of side sills, is joined to the rear end (for example, 3c) of the floor tunnel, and closes an opening (for example, 3d) of the rear end, and a partition portion (for example, SP) configured to partition an inside of the floor tunnel in the vehicle longitudinal direction, and a connecting portion (for example, CP) configured to connect a lower portion of the partition portion and a lower portion of the vertical wall are disposed in the floor tunnel.

According to this arrangement, since the vertical wall closes the opening of the rear end, and the partition portion is provided, the rigidity to a load in the direction of opening/closing the left and right side walls of the floor tunnel in the side-to-side direction improves. In addition, since a tubular body in the vehicle width direction is formed in the floor tunnel by the vertical wall, the partition portion, the connecting portion, and the upper wall of the floor tunnel, the rigidity to a load in the direction of opening/closing the left and right side walls of the floor tunnel in the side-to-side direction improves. Hence, the floor rigidity on the periphery of the floor tunnel can be improved. This can further thin a plate such as the front floor panel and reduce the weight. In addition, since the rigidity of the rear portion of the floor tunnel is reinforced using the vertical wall, the partition portion can have a relatively simple structure. This can suppress an increase in the weight as compared to a case in which a brace or the like is provided. Furthermore, since the cross member extends continuously in the vehicle width direction between the pair of side sills, a load at the time of a side impact can be transmitted from one side sill to the other side sill, thereby improving the side impact performance. Note that the vertical wall may close the whole area of the opening of the rear end. If the vertical wall is provided to run across the left and right side walls of the floor tunnel, the opening may partially be closed. If the opening is partially closed, a range corresponding to the upper half or more of the opening may be closed, and an unclosed portion may exist on the lower side.

2. According to the embodiment, there is provided the vehicle body structure (for example, A), wherein the vertical wall is formed from one plate member.

According to this arrangement, the weight can be reduced as compared to a case in which the vertical wall is formed from a plurality of plate members. In addition, the space occupied by the vertical wall can be reduced. This contributes to an increase in the space to arrange a peripheral component (for example, a fuel tank) or expansion of the space at the feet of an occupant.

3. According to the embodiment, there is provided the vehicle body structure (for example, A), wherein the cross member includes a flange portion (for example, 42) projecting from the lower portion of the vertical wall forward in the vehicle longitudinal direction, and the flange portion is joined to the front floor panel (for example, 42b).

According to this arrangement, it is possible to improve the load transmission performance between the front floor panel and the cross member via the flange portion and improve the riding comfort.

4. According to the embodiment, there is provided the vehicle body structure (for example, A), wherein one of the flange portion or the front floor panel includes a bent portion (for example, 42c) that extends in the vehicle width direction and where the one of the flange portion or the front floor panel is bent in a vertical direction, and the partition portion is arranged so as to continue to the bent portion.

According to this arrangement, since the bent portion and the partition portion continue in the vehicle width direction at a portion where the rigidity vehicle width direction improves, the load transmission performance in the vehicle width direction can be improved in a wide range, and the side impact performance can be improved.

5. According to the embodiment, there is provided the vehicle body structure (for example, A), further comprising:

a left floor frame (for example, 5) provided on the front floor panel on a left side of the floor tunnel and extending in the vehicle longitudinal direction; and a right floor frame (for example, 5) provided on the front floor panel on a right side of the floor tunnel and extending in the vehicle longitudinal direction, wherein rear ends of the left floor frame and the right floor frame are joined to the bent portion (for example, FIG. 3B).

According to this arrangement, the total length of the floor frame can be shortened while improving the floor rigidity, and the weight can be reduced.

6. According to the embodiment, there is provided the vehicle body structure (for example, A), wherein the vertical wall includes a bead (for example, 41a, 41b) extending in the vehicle width direction.

According to this arrangement, the bead improves the load transmission dispersion characteristic in the vehicle width direction, and the riding comfort can be improved.

7. According to the embodiment, there is provided the vehicle body structure (for example, A), further comprising:

a rear floor panel (for example, 6) extending from the vertical wall backward in the vehicle longitudinal direction; and a connection panel (for example, 8) extending from the vertical wall backward in the vehicle longitudinal direction, wherein the rear floor panel extends backward from an upper end of the vertical wall, the connection panel extends backward and obliquely upward from a position lower than the upper end of the vertical wall, and has a rear end joined to the rear floor panel, and the vertical wall, the rear floor panel, and the connection panel form a tubular body extending in the vehicle width direction.

According to this arrangement, since the tubular body is formed, the rigidity of the rear floor can be improved. In particular, since the tubular body has an almost triangular (truss-shaped) closed section, space saving can be implemented while improving the rigidity as compared to a case in which the tubular body has a rectangular closed section. This contributes to an increase in the space to arrange a peripheral component (for example, a fuel tank).

8. According to the embodiment, there is provided the vehicle body structure (for example, A), wherein the connection panel includes a flange portion (for example, 8a) joined to the vertical wall, the floor tunnel includes a flange portion (for example, 3a') extending from an upper wall (for example, 3a) of the floor tunnel and joined to the vertical wall, and the flange portion of the connection panel, the vertical wall, and the flange portion of the floor tunnel are overlaid.

According to this arrangement, since the three panel members are overlaid and joined, a load from the upper wall of the floor tunnel can smoothly be transmitted to the rear floor side, and the riding comfort can be improved.

9. According to the embodiment, there is provided the vehicle body structure (for example, A), further comprising a bulkhead (for example, 9) provided in the tubular body and configured to partition an inside of the tubular body in the vehicle width direction.

According to this arrangement, the rigidity of the tubular body improves, and the floor rigidity of the rear floor can further be improved.

10. According to the embodiment, there is provided the vehicle body structure (for example, A), wherein the partition portion, the connecting portion, the vertical wall, and an upper wall of the floor tunnel form a rectangular closed section (for example, S1)

According to this arrangement, the rigidity to a load in the direction of opening/closing the left and right side walls of the floor tunnel in the side-to-side direction improves.

11. According to the embodiment, there is provided the vehicle body structure (for example, A), wherein the connecting portion is formed from a flange portion (for example, 7b) extending from a lower portion of the partition portion backward in the vehicle longitudinal direction, and a flange portion (for example, 2a') extending from a lower portion of the vertical wall forward in the vehicle longitudinal direction.

According to this arrangement, the assembly operation can be facilitated, and the rigidity to a load in the direction of opening/closing the left and right side walls of the floor tunnel in the side-to-side direction improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2015-154481, filed Aug. 4, 2015, which is hereby incorporated by reference herein in its entirety.

What is claimed is:

1. A vehicle body structure comprising:
a pair of side sills arranged so as to be spaced apart in a vehicle width direction from each other;
a front floor panel provided between the pair of side sills;
a floor tunnel extending in a vehicle longitudinal direction at a center in the vehicle width direction between the pair of side sills and protruding upward from the front floor panel; and
a cross member extending in the vehicle width direction at a rear end of the floor tunnel,
wherein the cross member includes a vertical wall extending upward with respect to the front floor panel,
the vertical wall extends continuously in the vehicle width direction between the pair of side sills, is joined to the rear end of the floor tunnel, and closes an opening of the rear end, and
a partition portion configured to partition an inside of the floor tunnel in the vehicle longitudinal direction and a connecting portion configured to connect a lower portion of the partition portion and a lower portion of the vertical wall are disposed in the floor tunnel.

2. The structure according to claim 1, wherein the vertical wall is formed from one plate member.

3. The structure according to claim 1, wherein the cross member includes a flange portion projecting from the lower portion of the vertical wall forward in the vehicle longitudinal direction, and
the flange portion is joined to the front floor panel.

4. The structure according to claim 3, wherein one of the flange portion or the front floor panel includes a bent portion that extends in the vehicle width direction and where the one of the flange portion or the front floor panel is bent in a vertical direction, and
the partition portion is arranged so as to continue to the bent portion.

5. The structure according to claim 4, further comprising:
a left floor frame provided on the front floor panel on a left side of the floor tunnel and extending in the vehicle longitudinal direction; and
a right floor frame provided on the front floor panel on a right side of the floor tunnel and extending in the vehicle longitudinal direction,
wherein rear ends of the left floor frame and the right floor frame are joined to the bent portion.

6. The structure according to claim 1, wherein the vertical wall includes a bead extending in the vehicle width direction.

7. The structure according to claim 1, further comprising:
a rear floor panel extending from the vertical wall backward in the vehicle longitudinal direction; and
a connection panel extending from the vertical wall backward in the vehicle longitudinal direction,
wherein the rear floor panel extends backward from an upper end of the vertical wall,
the connection panel extends backward and obliquely upward from a position lower than the upper end of the vertical wall, and has a rear end joined to the rear floor panel, and
the vertical wall, the rear floor panel, and the connection panel form a tubular body extending in the vehicle width direction.

8. The structure according to claim 7, wherein the connection panel includes a flange portion joined to the vertical wall,
the floor tunnel includes a flange portion extending from an upper wall of the floor tunnel and joined to the vertical wall, and
the flange portion of the connection panel, the vertical wall, and the flange portion of the floor tunnel are overlaid.

9. The structure according to claim 7, further comprising a bulkhead provided in the tubular body and configured to partition an inside of the tubular body in the vehicle width direction.

10. The structure according to claim 1, wherein the partition portion, the connecting portion, the vertical wall, and an upper wall of the floor tunnel form a rectangular closed section.

11. The structure according to claim 1, wherein the connecting portion is formed from a flange portion extending from a lower portion of the partition portion backward in the vehicle longitudinal direction, and a flange portion extending from a lower portion of the vertical wall forward in the vehicle longitudinal direction.

* * * * *